(12) United States Patent  (10) Patent No.: US 9,790,006 B2
Yuno et al.  (45) Date of Patent: Oct. 17, 2017

(54) COVER MATERIAL FOR PACKAGING CONTAINER FOR RETORT STERILIZATION

(71) Applicant: Dai Nippon Printing Co., Ltd., Tokyo (JP)

(72) Inventors: Masato Yuno, Tokyo (JP); Kaoru Watanabe, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 509 days.

(21) Appl. No.: 14/386,282

(22) PCT Filed: Mar. 28, 2013

(86) PCT No.: PCT/JP2013/059182
§ 371 (c)(1),
(2) Date: Sep. 18, 2014

(87) PCT Pub. No.: WO2013/146978
PCT Pub. Date: Oct. 3, 2013

(65) Prior Publication Data
US 2015/0053680 A1 Feb. 26, 2015

(30) Foreign Application Priority Data
Mar. 29, 2012 (JP) .................................. 2012-075903

(51) Int. Cl.
*B32B 15/085* (2006.01)
*B32B 15/09* (2006.01)
(Continued)

(52) U.S. Cl.
CPC ............ *B65D 43/0233* (2013.01); *B32B 7/02* (2013.01); *B32B 7/06* (2013.01); *B32B 7/12* (2013.01);
(Continued)

(58) Field of Classification Search
CPC ....... B32B 15/08; B32B 15/085; B32B 15/09; B32B 2439/80; B32B 2581/00;
(Continued)

(56) References Cited

FOREIGN PATENT DOCUMENTS

EP 2 397 319 12/2011
EP 2 407 393 1/2012
(Continued)

OTHER PUBLICATIONS

Notification of Reasons for Refusal dated Dec. 1, 2015, in corresponding Japanese application No. 2012-075903 with English translation.
(Continued)

*Primary Examiner* — Yan Lan
(74) *Attorney, Agent, or Firm* — Wenderoth, Lind & Ponack, L.L.P.

(57) ABSTRACT

Provided is a cover material for packaging contains for retort sterilization which comes to exhibit excellent sealing strength through low-temperature, short-time heat sealing. The cover material for packaging containers for retort sterilization is constituted of a multilayered laminate obtained by superposing a base layer, an interlayer, and a sealing layer in this order, and is characterized in that the base layer is constituted of a laminated film obtained by laminating a polyethylene terephthalate film or polybutylene terephthalate film to an aluminum foil and the aluminum foil of the base layer has been laminated to the interlayer with a polyurethane-based adhesive or a polyester-based adhesive, and that the aluminum foil has a thickness of 7-40 μm, the polyethylene terephthalate film or the polybutylene terephthalate film has a thickness of 6-18 μm, the interlayer has a thickness of 10-100 μm, and the sealing layer has a thickness of 3-20 μm.

20 Claims, 1 Drawing Sheet (51) Int. Cl.
*B32B 15/08* (2006.01)
*B32B 7/02* (2006.01)
*B32B 7/12* (2006.01)
*B65D 43/02* (2006.01)
*B32B 27/08* (2006.01)
*B32B 27/32* (2006.01)
*B32B 27/36* (2006.01)
*B32B 7/06* (2006.01)
*B32B 15/20* (2006.01)
*B65D 77/20* (2006.01)

(52) U.S. Cl.
CPC ............ *B32B 15/08* (2013.01); *B32B 15/085* (2013.01); *B32B 15/09* (2013.01); *B32B 15/20* (2013.01); *B32B 27/08* (2013.01); *B32B 27/32* (2013.01); *B32B 27/36* (2013.01); *B65D 77/2032* (2013.01); *B32B 2270/00* (2013.01); *B32B 2307/31* (2013.01); *B32B 2307/732* (2013.01); *B32B 2307/748* (2013.01); *B32B 2323/043* (2013.01); *B32B 2435/02* (2013.01); *B32B 2439/80* (2013.01); *B32B 2581/00* (2013.01); *Y10T 428/24975* (2015.01)

(58) Field of Classification Search
CPC .. B32B 7/02; B32B 7/12; B32B 15/20; B32B 2270/00; B32B 2307/31; B32B 2307/732; B32B 2307/748; B32B 2323/043; B32B 2435/02; B32B 27/08; B32B 27/32; B32B 27/36; B32B 7/06; B65D 43/0233; B65D 77/2032; Y10T 428/24975
USPC .......................................... 428/126; 220/265
See application file for complete search history.

(56) References Cited

FOREIGN PATENT DOCUMENTS

| | | | |
|---|---|---|---|
| JP | 2003-312718 | | 11/2003 |
| JP | 2009-096153 | * | 5/2007 |
| JP | 2009-096153 | | 5/2009 |
| JP | 2009-96154 | | 5/2009 |
| JP | 2009-96155 | | 5/2009 |
| JP | 2011-25432 | | 2/2011 |

OTHER PUBLICATIONS

English Translation of International Preliminary Report on Patentability for PCT/JP2013/059182, dated Oct. 9, 2014.
International Search Report for PCT/JP2013/059182, dated Jul. 9, 2013.
Extended European Search Report dated Sep. 2, 2015 in corresponding European Application No. 13770007.6.

* cited by examiner

COVER MATERIAL FOR PACKAGING CONTAINER FOR RETORT STERILIZATION

TECHNICAL FIELD

The present invention relates to a cover material for a packaging container for retort sterilization, and specifically to a cover material that can be bonded to a container by low-temperature, short-time heat sealing.

BACKGROUND ART

Cup-shaped or tray-shaped plastic containers are used for filling of various different foods and beverages such as prepared food products, kneaded fish products, frozen foods, cooked foods, rice cakes, liquid soups, seasonings, drinking water and the like, and then have cover materials heat sealed to flange sections to produce packaged semi-processed products in various forms, after which the packaged semi-processed products are subjected to retort sterilizing treatment at, for example, approximately 110° C. to 130° C. and approximately 1-3 Kgf/cm$^2$·G for about 20 to 60 minutes, to produce retort sterilizing packaged foods in various forms.

The cover materials used to seal the openings of such containers must not undergo interlayer separation (delamination) by retort sterilizing treatment, and must also exhibit sealing performance that reliably protects the quality of the contents while also being easily openable, i.e. having an easy-peeling property, to facilitate opening at the time of consumption. In addition, bonding between the cover material and the container is usually carried out by heat sealing, but from the viewpoint of cost and productivity it must exhibit excellent seal strength by brief heat treatment at low temperature.

Conventionally, the cover materials used for containers for retort sterilization have been laminates composed of two layers, such as an aluminum foil layer and a sealing layer. The laminate must be subjected to high-temperature, prolonged heat sealing of about 190° C.·1 second for bonding with the container, and therefore cost and time are necessary for production, while they have also had problems of inferior physical strength such as pierce resistance and tearing strength.

On the other hand, packaging materials composing containers for retort sterilization have been disclosed in PTLs 1 and 2, for example, as multilayer laminated films having the following structure: 12 μm-thick polyethylene terephthalate film/7 μm-thick aluminum foil/15 μm-thick nylon film/50 μm-thick sealing layer. (Throughout the present specification, references to laminar structures of laminated bodies with slashes (/) indicate adjacency to the surrounding layers.) The multilayer laminated films described in PTLs 1 and 2 have excellent pierce resistance and tear resistance, but have still required high-temperature, prolonged heat sealing of about 190° C.·1 second for bonding of the multilayer laminated films to containers.

CITATION LIST

Patent Literature

[PTL 1] Japanese Unexamined Patent Application Publication No. 2009-96154
[PTL 2] Japanese Unexamined Patent Application Publication No. 2009-96155

SUMMARY OF INVENTION

Technical Problem

It is an object of the present invention to solve the problems mentioned above and provide a cover material for a packaging container for retort sterilization that exhibits excellent seal strength by brief, low-temperature heat sealing, that has excellent physical strength including pierce resistance and tear resistance, and that does not undergo interlayer separation (delamination) by retort sterilizing treatment.

Solution to Problem

As a result of diligent research directed toward solving the problems described above, the present inventors have found that in a cover material for a packaging container for retort sterilization comprising a multilayer laminate with a base layer, an interlayer and a sealing layer laminated in that order, using a laminated film comprising a polyethylene terephthalate film or polybutylene terephthalate film laminated on an aluminum foil as the base layer, using an ethylene/propylene block copolymer, ethylene/propylene random copolymer or high-density polyethylene as the interlayer, using a mixture of high-density polyethylene and an ethylene/propylene random copolymer as the sealing layer and specifying the layer thickness for each layer, and also laminating the aluminum foil and interlayer using a polyurethane-based adhesive or polyester-based adhesive, does not produce interlayer separation (delamination) by retort sterilizing treatment, the cover material has excellent physical strength and is suitable for brief, low-temperature heat sealing, and the invention has thus been completed.

Specifically, the present invention has the following features.

1. A cover material for a packaging container for retort sterilization, comprising a multilayer laminate obtained by laminating a base layer, interlayer and sealing layer in that order,
the base layer comprising a laminated film obtained by laminating a polyethylene terephthalate film or polybutylene terephthalate film on an aluminum foil,
the interlayer comprising an ethylene/propylene block copolymer, an ethylene/propylene random copolymer or high-density polyethylene,
the sealing layer comprising a mixture of high-density polyethylene and an ethylene/propylene random copolymer,
the base layer being laminated with the aluminum foil side facing the interlayer,
the aluminum foil and interlayer in the base layer being laminated using a polyurethane-based adhesive or a polyester-based adhesive, and
the thickness of the aluminum foil being 5 to 40 μm, the thickness of the polyethylene terephthalate film or polybutylene terephthalate film being 6 to 18 μm, the thickness of the interlayer being 10 to 100 μm and the thickness of the sealing layer being 3 to 20 μm.

2. A cover material according to 1. above, wherein the thickness of the aluminum foil is 5 to 30 μm.

3. A cover material according to 1. or 2. above, wherein the thickness of the polyethylene terephthalate film or polybutylene terephthalate film is 8 to 12 μm.

4. A cover material according to any one of 1. to 3. above, wherein the aluminum foil and the polyethylene terephthalate film or polybutylene terephthalate film in the base layer is laminated using a polyurethane-based adhesive or polyester-based adhesive.

5. A cover material according to any one of 1. to 4. above, wherein lamination of the interlayer and the sealing layer is accomplished by a co-extrusion lamination method.

6. A cover material according to any one of 1 to 5 above, wherein the delamination strength between the interlayer and the aluminum foil is 4-12 N/15 mm.

7. A packaging container employing a cover material according to any one of 1. to 6. above, wherein the sealing layer of the cover material is heat sealed in a state where it is folded in contact with the opening of the container, and at the time of opening, the sealing layer of the cover material is cohesively fractured for opening.

8. A packaging container according to 7. above, wherein the peel strength between the opening of the container and the sealing layer of the cover material is 10-25 N/15 mm.

Advantageous Effects of Invention

The cover material of the invention employs specific materials, namely a polyethylene terephthalate film or polybutylene terephthalate film and an aluminum foil, as the base layer, with a specific thickness for the film and aluminum foil. The cover material of the invention can be bonded with the container by brief, low-temperature heat sealing, thus reducing the time and cost for heat sealing. In other words, the cover material of the invention can reduce production costs.

When heat sealing is conducted at high temperature for a prolonged period of time, the resin composing the sealing layer becomes excessively incorporated into the container and the easy-peeling property is impaired. Also, the heat sealing is carried out using a ring seal or the like, but if heat sealing continues at high temperature for a prolonged period of time the sealing layer extrudes to the outer side and becomes thin and sparse, resulting in interlayer separation (delamination) between the container and cover material by the retort sterilizing treatment. Since the cover material of the invention can be bonded with a container by brief, low-temperature heat sealing, it has an excellent easy-peeling property and interlayer separation (delamination) between the container and cover material does not occur even with retort sterilizing treatment.

The cover material of the invention employs a polyethylene terephthalate film or polybutylene terephthalate film in the base layer, and therefore has excellent physical strength including pierce resistance and tear resistance. Also, when a nylon film is used as the cover material and subjected to prolonged storage, the film absorbs moisture and may undergo foaming during heat sealing, but the cover material of the invention does not employ a nylon film and therefore has excellent storage life.

In the cover material of the invention, the aluminum foil and interlayer in the base layer are laminated using a specific adhesive which is a polyurethane-based adhesive or polyester-based adhesive. The adhesive has satisfactory adhesion with both aluminum foil and the ethylene/propylene block copolymer or random copolymers or high-density polyethylene composing the interlayer of the invention, and therefore interlayer separation (delamination) between the aluminum foil and interlayer does not occur by retort sterilizing treatment.

DESCRIPTION OF EMBODIMENTS

The cover material of the invention will now be explained in greater detail.

The names of the resins used according to the invention are those commonly used in the industry. Also, for the purpose of the invention, the density is that measured according to JIS K7112.

Figure 1:
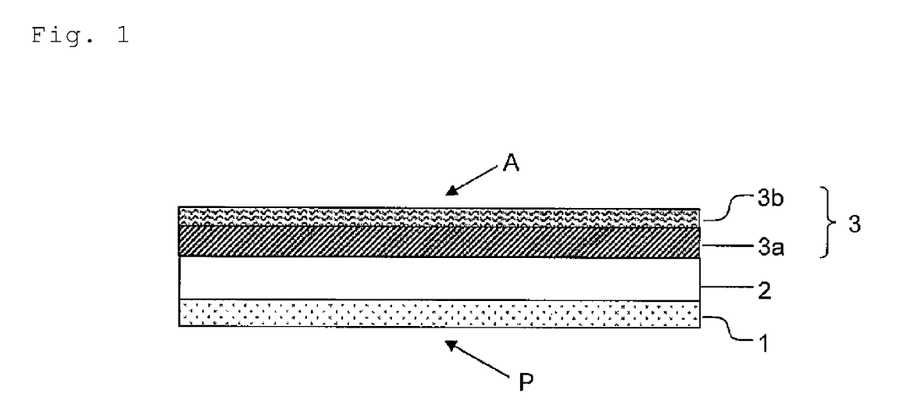
FIG. 1 is a schematic cross-sectional diagram showing an example of the laminar structure of a laminate composing a cover material of the invention.

<1> Laminate Composing Cover Material and Laminar Structure of Package Produced Using it FIG. 1 is a schematic cross-sectional diagram showing an example of the laminar structure of a laminate used to form a cover material of the invention.

As shown in FIG. 1, the cover material A of the invention has a basic structure with a sealing layer 1, interlayer 2 and base layer 3 laminated in that order. Here, the base layer 3 is composed of an aluminum foil 3a and a polyethylene terephthalate or polybutylene terephthalate film 3b, the aluminum foil 3a and the interlayer 2 being laminated using a polyurethane-based adhesive or a polyester-based adhesive. In order to seal a container using the cover material of the invention, the bonding surface P of the sealing layer 1 is layered against the surface of the container that is to be bonded, and is then heat sealed.

Figure 2:
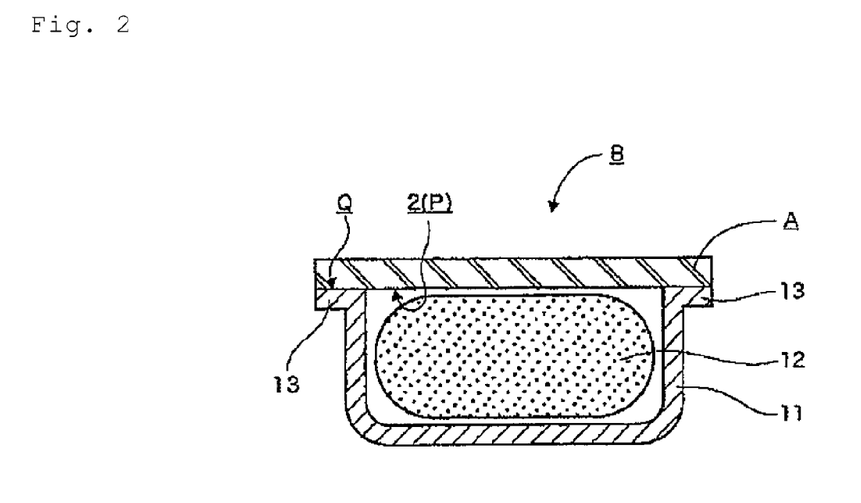
FIG. 2 is a cross-sectional diagram showing the laminar structure of an example of a package produced using a cover material of the invention.

FIG. 2 is a schematic cross-sectional diagram showing an example of a package produced using a cover material of the invention.

As shown in FIG. 2, the bonding surface P on the sealing layer 2 of the cover material A of the invention is layered against the adherend surface Q of the flange section 13 of the opening of the container 11 that is filled with the contents 12, and is then heat sealed for sealing to produce a package B of the invention. The adherend surface Q of the flange section 13 is coated with a polypropylene resin, and is then fused with the resin composition forming the sealing layer 1, exhibiting excellent seal stability and contaminant sealing properties.

The material used to form a multilayer laminated film of the invention, and a method for producing it, will now be explained.

<2> Base Layer (1) Polyethylene Terephthalate Film or Polybutylene Terephthalate Film The polyethylene terephthalate film used to compose the base layer of the cover material of the invention may be obtained, for example, by condensation reaction of terephthalic acid or its derivative with ethylene glycol. Also, the polybutylene terephthalate film used may be obtained, for example, by condensation reaction of terephthalic acid or its derivative with 1,4-butanediol. The polyethylene terephthalate film or polybutylene terephthalate film may be unstretched, or it may be a stretched film stretched uniaxially in either the longitudinal direction or transverse direction, or biaxially stretched. The stretching method may be a known method such as a flat method or inflation method, and the draw ratio may be 2- to 10-fold.

According to the invention, the thickness of the film must be 6 to 18 µm, and it is preferably 8 to 12 µm. If the thickness of the film is less than 6 µm or 8 µm it will not be possible to accomplish stable film formation, and if it is greater than 18 µm or 12 µm, prolonged heat sealing at high temperature will be necessary for bonding with the container, and production cost will tend to increase.

Depending on the purpose of use, various additives such as antistatic agents, ultraviolet absorbers, plasticizers, lubricants or fillers may be added as desired to the polyethylene terephthalate film or polybutylene terephthalate film.

Examples of suitable polyethylene terephthalate films to be used for the invention include T4102 and T4100, by Toyobo, Ltd.

(2) Aluminum Foil

The aluminum foil used to compose the base layer of the cover material of the invention may be a common soft aluminum foil, and the surface of the aluminum foil may also be subjected to necessary printing and the like.

The thickness of the aluminum foil to be used must be 5 to 40 μm, and it is preferably 5 to 30 μm. If the thickness of the aluminum foil is less than 5 μm, the obtained base material will curl and lamination with the interlayer or sealing layer will become difficult. If the thickness of the aluminum foil is greater than 40 μm or 30 μm, prolonged heat sealing at high temperature will be necessary for bonding with the container, and production cost will tend to increase.

<3> Interlayer

The interlayer of the cover material of the invention must not only contribute to easy openability together with the sealing layer, but must also have strength for the function of a packaging container cover material or packaging bag, satisfactory film formation stability, and heat resistance that can withstand retort sterilizing treatment. As a resin satisfying this requirement there is used high-density polyethylene with a density of 0.945 to 0.965 g/cm$^3$, or an ethylene/propylene block copolymer or random copolymer. According to the invention, polyethylene includes ethylene homopolymer, and block or random copolymers of ethylene with other a-olefins (such as propylene, 1-butene, 1-pentene, 1-hexene or 1-octene).

The thickness of the interlayer will usually be 10 to 100 μm and is preferably 25 to 40 μm, from the viewpoint of easy-peeling properties.

Examples of high-density polyethylene include HIZEX 3300F by Prime Polymer Co., Ltd., and NOVATEC HJ360 and NOVATEC HJ362N by Japan Polyethylene Corp. Also, examples of ethylene/propylene block copolymers include PF380A, PC540R and FX4E by SunAllomer, Ltd. and FW4BT by Japan Polypropylene Corp., and ethylene/propylene random copolymers include J235T by Prime Polymer Co., Ltd., and NOVATEC FL03A by Japan Polypropylene Corp.

<4> Sealing Layer (1) High-Density Polyethylene

The high-density polyethylene used to compose the sealing layer may be a resin with a relatively high melt viscosity, having a density of 0.945 to 0.965 g/cm$^3$ and more preferably 0.950 to 0.955 g/cm$^3$, and a MFR (190° C.) of 1-7 g/10 min and more preferably 1-4 g/10 min. Using such a resin can prevent scuffing during peeling of the cover material, and thus ensure an aesthetic outer appearance after peeling.

If the density is less than 0.945 g/cm$^3$ there may be increased stringiness, while if it is greater than 0.965 g/cm$^3$ there may be more production of unmelted products during film formation, thus potentially impairing the outer appearance of the film. If the MFR (190° C.) is less than 1 g/10 min, production will be hampered due to a reduced flow property while the compatibility with ethylene/propylene random copolymers will be poor, thus resulting in visible irregularities. If it exceeds 7 g/10 min, its MFR will no longer differ from that of ethylene/propylene random copolymers, which is undesirable as their interdispersibility will increase and the easy openability will not be obtained. The MFR (190° C.) is the value measured according to JIS K6922.

Examples of high-density polyethylene include HIZEX 3300F by Prime Polymer Co., Ltd., and NOVATEC HJ360 and HJ362N by Japan Polyethylene Corp.

(2) Ethylene/Propylene Random Copolymer

The ethylene/propylene random copolymer used to form the sealing layer may be a resin with a density of 0.9 to 0.91 g/cm$^3$ and a MFR (230° C.) of 5-30 g/10 min. If the MFR (230° C.) is less than 5 g/10 min, the flow property will approach that of high-density polyethylene which has a low MFR, creating a finely dispersed state and making it impossible to obtain a satisfactory level of easy openability. If the MFR (230° C.) is greater than 30 g/10 min, the high flow property will make it impossible to form the film by inflation film formation. The MFR (230° C.) is the value measured according to JIS K6921.

Examples of suitable ethylene/propylene random copolymers for use according to the invention include J235T by Prime Polymer Co., Ltd., and NOVATEC FL03A by Japan Polypropylene Corp.

(3) Blend Ratio

According to the invention it is possible to provide a packaging container with a superior easy-peeling property compared to conventional products, wherein a mixture of high-density polyethylene and an ethylene/propylene random copolymer is used as the sealing layer, and the sealing layer undergoes cohesive fracture during opening and the peel strength is 10-25 N/15 mm.

In order to obtain such properties, the blend ratio of the high-density polyethylene and ethylene/propylene random copolymer of the sealing layer is 10 to 50 parts by weight of the high-density polyethylene and 50 to 90 parts by weight of the ethylene/propylene random copolymer. If the proportion of the ethylene/propylene random copolymer is higher than this range the bonding strength will be too high preventing satisfactory easy openability, while if the proportion is lower, the bonding strength will not be sufficient and the sealing performance of the packaging container or packaging bag will not be satisfactory.

(4) Layer Thickness

The layer thickness of the sealing layer is 3 to 20 μm and preferably 3 to 10 μm. At greater than 20 μm or 10 μm, the release layer (cohesive release layer) may become fouled, impairing the aesthetic quality of the release surface.

<5> Method for Producing Laminate Composing Cover Material

For production of the laminate that is to compose the cover material of the invention, a sealant film comprising an interlayer and a sealing layer, the resins and resin compositions serving as the materials for each layer may be formed by co-extrusion using a T-die co-extrusion device or a co-extrusion inflation film forming device.

Also, the aluminum foil composing the base layer and the sealant film produced as described above can be bonded by a dry lamination method, in which case the adhesive used for dry lamination may be a polyurethane-based adhesive or polyester-based adhesive. By using a polyurethane-based adhesive or polyester-based adhesive, the delamination strength between the aluminum foil and interlayer can be as strong as 4-12 N/15 mm, and it is possible to avoid interlayer separation (delamination) during the retort sterilization step.

In addition, lamination between the polyethylene terephthalate film or polybutylene terephthalate film and the aluminum foil forms an adhesive layer for lamination, and this may be accomplished using a method of dry lamination of a desired base material such as a plastic film forming a heat sealable resin layer or the like, through the adhesive layer for lamination. In this case, the adhesive for dry lamination may be a known adhesive, for example, a polyvinyl acetate-based adhesive, a polyacrylic acid ester-based adhesive composed of a homopolymer of an ethyl, butyl or 2-ethylhexyl ester of acrylic acid or the like, or a copolymer of these with methyl methacrylate, acrylonitrile, styrene or the like, a cyano acrylate-based adhesive, an ethylene copolymer-based adhesive composed of a copolymer of ethylene with a monomer such as vinyl acetate, ethyl acrylate, acrylic acid or methacrylic acid, a cellulose-based adhesive, a polyester-based adhesive, a polyamide-based adhesive, a polyimide-based adhesive, an amino resin-based adhesive made of a urea resin or melamine resin, a phenol resin-based adhesive, an epoxy-based adhesive, a polyurethane-based adhesive, a reactive (meth)acrylic-based adhesive, a rubber-based adhesive made of chloroprene rubber, nitrile rubber, styrene-butadiene rubber or the like, a silicone-based adhesive, or an inorganic adhesive made of an alkali metal silicate or low melting point glass. Of these, polyurethane-based adhesives or polyester-based adhesives are preferably used from the viewpoint of adhesive property.

<6> Production of Cover Material and Package

The cover material of the invention is produced by punching out the laminate obtained as described above, into the form of the flange section provided around the opening of the container.

For actual production, it is common to employ any of various methods such as production as a sheet-like cover material pre-punched to match the shape of the opening of the container, or supplying a wound-up cover material to a filling seal apparatus and heat sealing to the flange section around the opening of a container that is filled with contents, followed by punching to individual shapes in an inline fashion.

The package of the invention can be produced by layering the sealing layer side of the cover material facing the flange section of the container that is filled with contents, and heat sealing it. The flange section of the container is coated with a polypropylene resin.

The contents to be sealed in the packaging container of the invention may be any of various foods and beverages including prepared food products, kneaded fish products, frozen foods, cooked foods, rice cakes, liquid soups, seasonings, drinking water or the like, with no limitation to these.

Also, the container used may be a container in any of various shapes such as rectilinear, round, pyramidal or circular conical, depending on the purpose and usage, and so long as the adherend surface of the flange section is coated with a polypropylene resin, the other sections may be made of any material.

According to the invention, the method of heat sealing the cover material and container may be a known method such as bar sealing, revolving roll sealing, belt sealing, impulse sealing, high-frequency sealing or ultrasonic sealing.

EXAMPLES

The present invention will now be explained in greater detail using examples.

Example 1

(1) Sealing Layer

There were thoroughly kneaded 30 parts by weight of high-density polyethylene (NOVATEC HJ362N by Japan Polyethylene Corp., density=0.953 g/cm$^3$, MFR (190° C.)=5.0 g/10 min) and 70 parts by weight of an ethylene/propylene random copolymer (NOVATEC FL03A, product of Japan Polypropylene Corp., density=0.9 g/cm$^3$, MFR (230° C.)=20 g/10 min), to prepare a resin composition for a sealing layer.

(2) Interlayer

A resin composition for an interlayer was prepared by thoroughly kneading 100 parts by weight of an ethylene/propylene block copolymer (PF380A, product of SunAllomer, Ltd., density=0.9 g/cm$^3$, MFR (230° C.)=1.1 g/10 min).

The resin composition for the sealing layer and the resin composition for the interlayer, prepared as described above, were used to produce a multilayer laminated film with a total thickness of 50 μm (5 μm sealing layer/45 μm interlayer) with a top-blown air-cooled inflation co-extrusion film-forming machine.

Next, the surface of the interlayer on the side opposite the sealing layer was subjected to corona treatment, and an aluminum foil (7 μm thickness, product of Toyo Aluminium, K.K.) was attached to the surface by dry lamination using a two-pack curable adhesive (base compound: polyester polyol; RU-77T by Rock Paint Co., curing agent: aliphatic isocyanate; H-7 by Rock Paint Co.).

To the aluminum foil surface of the attached film there was attached a stretched PET film (T4102 by Toyobo, Ltd., (single-side corona treatment: 12 μm thickness)) by dry lamination using a two-pack curable adhesive (base compound: polyester polyol; RU-77T by Rock Paint Co., curing agent: aliphatic isocyanate; H-7 by Rock Paint Co.).

The obtained multilayer laminated film had the structure: (sealing layer/interlayer/DL/aluminum foil/DL/stretched PET film layer) (where DL represents the adhesive sections).

Example 2

(1) Sealing Layer

There were thoroughly kneaded 30 parts by weight of high-density polyethylene (NOVATEC HJ362N by Japan Polyethylene Corp., density=0.953 g/cm$^3$, MFR (190° C.)=5.0 g/10 min) and 70 parts by weight of an ethylene/propylene random copolymer (NOVATEC FL03A, product of Japan Polypropylene Corp., density=0.9 g/cm$^3$, MFR (230° C.)=20 g/10 min), to prepare a resin composition for a sealing layer.

(2) Interlayer

A resin composition for an interlayer was prepared by thoroughly kneading 100 parts by weight of an ethylene/propylene block copolymer (PF380A, product of SunAllomer, Ltd., density=0.9 g/cm$^3$, MFR (230° C.)=1.1 g/10 min).

The resin composition for the sealing layer and the resin composition for the interlayer, prepared as described above, were used to produce a multilayer laminated film with a total thickness of 50 μm (5 μm sealing layer/45 μm interlayer) with a top-blown air-cooled inflation co-extrusion film-forming machine.

Next, the surface of the interlayer on the side opposite the sealing layer was subjected to corona treatment, and an aluminum foil (15 μm thickness, product of Toyo Aluminium, K.K.) was attached to the surface by dry lamination using a two-pack curable adhesive (base compound: polyester polyol; RU-77T by Rock Paint Co., curing agent: aliphatic isocyanate; H-7 by Rock Paint Co.).

To the aluminum foil surface of the attached film there was attached a stretched PET film (T4102 by Toyobo, Ltd., (single-side corona treatment: 12 μm thickness)) by dry lamination using a two-pack curable adhesive (base compound: polyester polyol; RU-77T by Rock Paint Co., curing agent: aliphatic isocyanate; H-7 by Rock Paint Co.).

The obtained multilayer laminated film had the structure: (sealing layer/interlayer/DL/aluminum foil/DL/stretched PET film layer) (where DL represents the adhesive sections).

Example 3

(1) Sealing Layer

There were thoroughly kneaded 30 parts by weight of high-density polyethylene (NOVATEC HJ362N by Japan Polyethylene Corp., density=0.953 g/cm$^3$, MFR (190° C.)=5.0 g/10 min) and 70 parts by weight of an ethylene/propylene random copolymer (NOVATEC FL03A, product of Japan Polypropylene Corp., density=0.9 g/cm$^3$, MFR (230° C.)=20 g/10 min), to prepare a resin composition for a sealing layer.

(2) Interlayer

A resin composition for an interlayer was prepared by thoroughly kneading 100 parts by weight of an ethylene/propylene block copolymer (PF380A, product of SunAllomer, Ltd., density=0.9 g/cm$^3$, MFR (230° C.)=1.1 g/10 min).

The resin composition for the sealing layer and the resin composition for the interlayer, prepared as described above, were used to produce a multilayer laminated film with a total thickness of 50 μm (5 μm sealing layer/45 μm interlayer) with a top-blown air-cooled inflation co-extrusion film-forming machine.

Next, the surface of the interlayer on the side opposite the sealing layer was subjected to corona treatment, and an aluminum foil (30 μm thickness, product of Toyo Aluminium, K.K.) was attached to the surface by dry lamination using a two-pack curable adhesive (base compound: polyester polyol, curing agent; RU-77T by Rock Paint Co.: aliphatic isocyanate; H-7 by Rock Paint Co.).

To the aluminum foil surface of the attached film there was attached a stretched PET film (T4102 by Toyobo, Ltd., (single-side corona treatment: 12 μm thickness)) by dry lamination using a two-pack curable adhesive (base compound: polyester polyol; RU-77T by Rock Paint Co., curing agent: aliphatic isocyanate; H-7 by Rock Paint Co.).

The obtained multilayer laminated film had the structure: (sealing layer/interlayer/DL/aluminum foil/DL/stretched PET film layer) (where DL represents the adhesive sections).

Example 4

(1) Sealing Layer

There were thoroughly kneaded 30 parts by weight of high-density polyethylene (NOVATEC HJ362N by Japan Polyethylene Corp., density=0.953 g/cm$^3$, MFR (190° C.)=5.0 g/10 min) and 70 parts by weight of an ethylene/propylene random copolymer (NOVATEC FL03A, product of Japan Polypropylene Corp., density=0.9 g/cm$^3$, MFR (230° C.)=20 g/10 min), to prepare a resin composition for a sealing layer.

(2) Interlayer

A resin composition for an interlayer was prepared by thoroughly kneading 100 parts by weight of an ethylene/propylene block copolymer (PF380A, product of SunAllomer, Ltd., density=0.9 g/cm$^3$, MFR (230° C.)=1.1 g/10 min).

The resin composition for the sealing layer and the resin composition for the interlayer, prepared as described above, were used to produce a multilayer laminated film with a total thickness of 50 μm (5 μm sealing layer/45 μm interlayer) with a top-blown air-cooled inflation co-extrusion film-forming machine.

Next, the surface of the interlayer on the side opposite the sealing layer was subjected to corona treatment, and an aluminum foil (15 μm thickness, product of Toyo Aluminium, K.K.) was attached to the surface by dry lamination using a two-pack curable adhesive (base compound: polyester polyol; RU-77T by Rock Paint Co., curing agent: aliphatic isocyanate; H-7 by Rock Paint Co.).

To the aluminum foil surface of the attached film there was attached a stretched PET film (T4100 by Toyobo, Ltd., (single-side corona treatment: 9 μm thickness)) by dry lamination using a two-pack curable adhesive (base compound: polyester polyol; RU-77T by Rock Paint Co., curing agent: aliphatic isocyanate; H-7 by Rock Paint Co.).

The obtained multilayer laminated film had the structure: (sealing layer/interlayer/DL/aluminum foil/DL/stretched PET film layer) (where DL represents the adhesive sections).

Example 5

(1) Sealing Layer

There were thoroughly kneaded 30 parts by weight of high-density polyethylene (NOVATEC HJ362N by Japan Polyethylene Corp., density=0.953 g/cm$^3$, MFR (190° C.)=5.0 g/10 min) and 70 parts by weight of an ethylene/propylene random copolymer (NOVATEC FL03A, product of Japan Polypropylene Corp., density=0.9 g/cm$^3$, MFR (230° C.)=20 g/10 min), to prepare a resin composition for a sealing layer.

(2) Interlayer

A resin composition for an interlayer was prepared by thoroughly kneading 100 parts by weight of an ethylene/propylene block copolymer (PF380A, product of SunAllomer, Ltd., density=0.9 g/cm$^3$, MFR (230° C.)=1.1 g/10 min).

The resin composition for the sealing layer and the resin composition for the interlayer, prepared as described above, were used to produce a multilayer laminated film with a total thickness of 50 μm (5 μm sealing layer/45 μm interlayer) with a top-blown air-cooled inflation co-extrusion film-forming machine.

Next, the surface of the interlayer on the side opposite the sealing layer was subjected to corona treatment, and an aluminum foil (7 μm thickness, product of Toyo Aluminium, K.K.) was attached to the surface by dry lamination using a two-pack curable adhesive (base compound: polyester polyol; RU-77T by Rock Paint Co., curing agent: aliphatic isocyanate; H-7 by Rock Paint Co.).

To the aluminum foil surface of the attached film there was attached a stretched PET film (T4100 by Toyobo, Ltd., (single-side corona treatment: 16 μm thickness)) by dry lamination using a two-pack curable adhesive (base compound: polyester polyol; RU-77T by Rock Paint Co., curing agent: aliphatic isocyanate; H-7 by Rock Paint Co.).

The obtained multilayer laminated film had the structure: (sealing layer/interlayer/DL/aluminum foil/DL/stretched PET film layer) (where DL represents the adhesive sections).

Comparative Example 1

(1) Sealing Layer

There were thoroughly kneaded 30 parts by weight of high-density polyethylene (NOVATEC HJ362N by Japan Polyethylene Corp., density=0.953 g/cm$^3$, MFR (190°

C.)=5.0 g/10 min) and 70 parts by weight of an ethylene/propylene random copolymer (NOVATEC FL03A, product of Japan Polypropylene Corp., density=0.9 g/cm³, MFR (230° C.)=20 g/10 min), to prepare a resin composition for a sealing layer.

(2) Interlayer

A resin composition for an interlayer was prepared by thoroughly kneading 100 parts by weight of an ethylene/propylene block copolymer (PF380A, product of SunAllomer, Ltd., density=0.9 g/cm³, MFR (230° C.)=1.1 g/10 min).

The resin composition for the sealing layer and the resin composition for the interlayer, prepared as described above, were used to produce a multilayer laminated film with a total thickness of 50 μm (5 μm sealing layer/45 μm interlayer) with a top-blown air-cooled inflation co-extrusion film-forming machine.

Next, the surface of the interlayer on the side opposite the sealing layer was subjected to corona treatment, and an aluminum foil (50 μm thickness, product of Toyo Aluminium, K.K.) was attached to the surface by dry lamination using a two-pack curable adhesive (base compound: polyester polyol; RU-77T by Rock Paint Co., curing agent: aliphatic isocyanate; H-7 by Rock Paint Co.).

The obtained multilayer laminated film had the structure: (sealing layer/interlayer/DL/aluminum foil) (where DL represents the adhesive sections).

Comparative Example 2

(1) Sealing Layer

There were thoroughly kneaded 30 parts by weight of high-density polyethylene (NOVATEC HJ362N by Japan Polyethylene Corp., density=0.953 g/cm³, MFR (190° C.)=5.0 g/10 min) and 70 parts by weight of an ethylene/propylene random copolymer (NOVATEC FL03A, product of Japan Polypropylene Corp., density=0.9 g/cm³, MFR (230° C.)=20 g/10 min), to prepare a resin composition for a sealing layer.

(2) Interlayer

A resin composition for a sealing layer was prepared by thoroughly kneading 100 parts by weight of an ethylene/propylene block copolymer (PF380A, product of SunAllomer, Ltd., density=0.9 g/cm³, MFR (230° C.)=1.1 g/10 min).

The resin composition for the sealing layer and the resin composition for the interlayer, prepared as described above, were used to produce a multilayer laminated film with a total thickness of 50 μm (5 μm sealing layer/45 μm interlayer) with a top-blown air-cooled inflation co-extrusion film-forming machine.

Next, the surface of the interlayer on the side opposite the sealing layer was subjected to corona treatment, and an aluminum foil (15 μm thickness, product of Toyo Aluminium, K.K.) was attached to the surface by dry lamination using a two-pack curable adhesive (base compound: polyester polyol; RU-77T by Rock Paint Co., curing agent: aliphatic isocyanate; H-7 by Rock Paint Co.).

To the aluminum foil surface of the attached film there was attached a stretched nylon film (EMBLEM ONBC by Unitika, Ltd., (double-side corona treatment: 15 μm thickness)) by dry lamination using a two-pack curable adhesive (base compound: polyester polyol; RU-77T by Rock Paint Co., curing agent: aliphatic isocyanate; H-7 by Rock Paint Co.).

To the stretched nylon film surface of the attached film there was attached a stretched PET film (T4100 by Toyobo, Ltd., (single-side corona treatment: 12 μm thickness)) by dry lamination using a two-pack curable adhesive (base compound: polyester polyol; RU-77T by Rock Paint Co., curing agent: aliphatic isocyanate; H-7 by Rock Paint Co.).

The obtained multilayer laminated film had the structure: (sealing layer/interlayer/DL/aluminum foil/DL/stretched nylon film layer/DL/stretched PET film layer) (where DL represents the adhesive sections).

Comparative Example 3

(1) Sealing Layer

There were thoroughly kneaded 30 parts by weight of high-density polyethylene (NOVATEC HJ362N by Japan Polyethylene Corp., density=0.953 g/cm³, MFR (190° C.)=5.0 g/10 min) and 70 parts by weight of an ethylene/propylene random copolymer (NOVATEC FL03A, product of Japan Polypropylene Corp., density=0.9 g/cm³, MFR (230° C.)=20 g/10 min), to prepare a resin composition for a sealing layer.

(2) Interlayer

A resin composition for an interlayer was prepared by thoroughly kneading 100 parts by weight of an ethylene/propylene block copolymer (PF380A, product of SunAllomer, Ltd., density=0.9 g/cm³, MFR (230° C.)=1.1 g/10 min).

The resin composition for the sealing layer and the resin composition for the interlayer, prepared as described above, were used to produce a multilayer laminated film with a total thickness of 50 μm (5 μm sealing layer/45 μm interlayer) with a top-blown air-cooled inflation co-extrusion film-forming machine.

Next, the surface of the interlayer on the side opposite the sealing layer was subjected to corona treatment, and an aluminum foil (7 μm thickness, product of Toyo Aluminium, K.K.) was attached to the surface by dry lamination using a two-pack curable adhesive (base compound: polyether polyol; TAKELAC A-980 by Mitsui Chemicals, Inc., curing agent: aliphatic isocyanate; TAKENATE A-19 by Mitsui Chemicals, Inc.).

To the aluminum foil surface of the attached film there was attached a stretched PET film (T4102 by Toyobo, Ltd., (single-side corona treatment: 12 μm thickness)) by dry lamination using a two-pack curable adhesive (base compound: polyether polyol; TAKELAC A-980 by Mitsui Chemicals, Inc., curing agent: aliphatic isocyanate; TAKENATE A-19 by Mitsui Chemicals, Inc.).

The obtained multilayer laminated film had the structure: (sealing layer/interlayer/DL/aluminum foil/DL/stretched PET film layer) (where DL represents the adhesive sections).

[Seal Strength Test]

Samples were prepared from flat seals of the multilayer laminated films produced in Examples 1 to 5 and Comparative Examples 1 to 3 on 300 μm-thick sheets made of polypropylene resin, under conditions with a seal temperature of 150° C. to 200° C., a seal pressure of 1 kg/cm² and a seal time of 1 second, and heat sterilization treatment was carried out at 120° C. for 30 minutes.

Following heat treatment, 15 mm-wide test pieces were prepared and subjected to tensile testing at a test speed of 300 mm/min, and the strength was measured. The results are shown in the table.

TABLE 1

Seal strength results

| | \_\_\_\_\_\_\_\_\_\_\_\_\_\_\_\_\_\_\_\_ Seal temperature \_\_\_\_\_\_\_\_\_\_\_\_\_\_\_\_\_\_\_\_ | | | | | |
|---|---|---|---|---|---|---|
| | 150° C. | 160° C. | 170° C. | 180° C. | 190° C. | 200° C. |
| Example 1 | 1.5 | 14.2 | 15.7 | 15.6 | 17.2 | 16.3 |
| Example 2 | 1.4 | 12.2 | 16.2 | 15.7 | 16.7 | 17.8 |
| Example 3 | 0.8 | 17.5 | 18.3 | 18.3 | 18.2 | 18.7 |
| Example 4 | 1.6 | 15.7 | 16.4 | 16.8 | 15.7 | 16.6 |
| Example 5 | 1.2 | 12.4 | 15.4 | 16.7 | 15.8 | 16.7 |
| Comp. Ex. 1 | 0.0 | 1.5 | 5.0 | 7.8 | 16.7 | 19.2 |
| Comp. Ex. 2 | 0.0 | 2.0 | 12.6 | 18.5 | 19.7 | 17.1 |
| Comp. Ex. 3 | 0 | 1.7 | 6.8 | 6.5 | 8.5 | 7.8 |

*Units: N/15 mm

As shown in Table 1, the covers wherein the thicknesses of the polyethylene terephthalate films and aluminum foils were in ranges of 6 to 18 μm and 7 to 40 μm, respectively, and a two-pack curable polyester-based adhesive was used as the adhesive, had more excellent heat seal strength by low-temperature heat sealing than those wherein the polyethylene terephthalate film and aluminum foil thicknesses were outside of the aforementioned ranges and other adhesives were used.

For example, the thicknesses of the polyethylene terephthalate film and aluminum foil for the multilayer laminated film of Example 1 were 12 μm and 7 μm, respectively, and a two-pack curable polyester-based adhesive was used as the adhesive, and it was confirmed to have excellent seal strength under low temperature heat seal conditions of 160° C.

In contrast, the multilayer laminated film of Comparative Example 1 which had an aluminum foil thickness of 50 μm was confirmed to have inferior seal strength under low-temperature heat seal conditions of 160° C. to 180° C.

Also, the multilayer laminated film of Comparative Example 3, which employed polyether polyol as the adhesive, exhibited interlayer separation (delamination) at various locations between the interlayer and aluminum foil or between the aluminum foil and polyethylene terephthalate film in heat sterilization treatment, and satisfactory seal strength could not be obtained under any heat seal conditions. Also, further interlayer separation (delamination) occurred between the interlayer and aluminum foil or between the aluminum foil and polyethylene terephthalate film in peel testing, notably impairing the appearance upon release.

EXPLANATION OF SYMBOLS

1 Sealing layer
2 Interlayer
3 Base layer
3a Aluminum foil
3b Polyethylene terephthalate film or polybutylene terephthalate film
11 Container
12 Contents
13 Flange section
A Cover material
B Package
P Bonding surface of cover material
Q Adherend surface of flange section

The invention claimed is:

1. A cover material for a packaging container for retort sterilization, comprising a multilayer laminate obtained by laminating a base layer, interlayer and sealing layer in that order,
    the base layer comprising a laminated film obtained by laminating a polyethylene terephthalate film or polybutylene terephthalate film on an aluminum foil,
    the interlayer comprising an ethylene/propylene block copolymer, an ethylene/propylene random copolymer or high-density polyethylene,
    the sealing layer comprising a mixture of high-density polyethylene and an ethylene/propylene random copolymer,
    the base layer being laminated with the aluminum foil side facing the interlayer,
    the aluminum foil and interlayer in the base layer being laminated using a polyurethane-based adhesive or a polyester-based adhesive,
    the interlayer is laminated on the sealing layer such that the interlayer is in contact with the sealing layer, and
    the thickness of the aluminum foil being 5 to 40 μm, the thickness of the polyethylene terephthalate film or polybutylene terephthalate film being 6 to 18 μm, the thickness of the interlayer being 10 to 100 μm and the thickness of the sealing layer being 3 to 20 μm.

2. A cover material according to claim 1, wherein the thickness of the aluminum foil is 5 to 30 μm.

3. A cover material according to claim 1, wherein the thickness of the polyethylene terephthalate film or polybutylene terephthalate film is 8 to 12 μm.

4. A cover material according to claim 1, wherein the aluminum foil and the polyethylene terephthalate film or polybutylene terephthalate film in the base layer is laminated using a polyurethane-based adhesive or polyester-based adhesive.

5. A cover material according to claim 1, wherein lamination of the interlayer and the sealing layer is accomplished by a co-extrusion lamination method.

6. A cover material according to claim 1, wherein the delamination strength between the interlayer and the aluminum foil is 4-12 N/15 mm.

7. A packaging container employing a cover material according to claim 1, wherein the sealing layer of the cover material is heat sealed in a state where it is folded in contact with the opening of the container, and at the time of opening, the sealing layer of the cover material is cohesively fractured for opening.

8. A packaging container according to claim 7, wherein the peel strength between the opening of the container and the sealing layer of the cover material is 10-25 N/15 mm.

9. A cover material according to claim 2, wherein the thickness of the polyethylene terephthalate film or polybutylene terephthalate film is 8 to 12 μm.

10. A cover material according to claim 2, wherein the aluminum foil and the polyethylene terephthalate film or polybutylene terephthalate film in the base layer is laminated using a polyurethane-based adhesive or polyester-based adhesive.

11. A cover material according to claim 3, wherein the aluminum foil and the polyethylene terephthalate film or polybutylene terephthalate film in the base layer is laminated using a polyurethane-based adhesive or polyester-based adhesive.

12. A cover material according to claim 2, wherein lamination of the interlayer and the sealing layer is accomplished by a co-extrusion lamination method.

13. A cover material according to claim 3, wherein lamination of the interlayer and the sealing layer is accomplished by a co-extrusion lamination method.

14. A cover material according to claim 4, wherein lamination of the interlayer and the sealing layer is accomplished by a co-extrusion lamination method.

15. A cover material according to claim 2, wherein the delamination strength between the interlayer and the aluminum foil is 4-12 N/15 mm.

16. A cover material according to claim 3, wherein the delamination strength between the interlayer and the aluminum foil is 4-12 N/15 mm.

17. A cover material according to claim 4, wherein the delamination strength between the interlayer and the aluminum foil is 4-12 N/15 mm.

18. A cover material according to claim 5, wherein the delamination strength between the interlayer and the aluminum foil is 4-12 N/15 mm.

19. A packaging container employing a cover material according to claim 2, wherein the sealing layer of the cover material is heat sealed in a state where it is folded in contact with the opening of the container, and at the time of opening, the sealing layer of the cover material is cohesively fractured for opening.

20. A packaging container employing a cover material according to claim 3, wherein the sealing layer of the cover material is heat sealed in a state where it is folded in contact with the opening of the container, and at the time of opening, the sealing layer of the cover material is cohesively fractured for opening.

* * * * *